Feb. 23, 1971  M. G. M. JOCHAUD DU PLESSIX ET AL  3,565,690
SHOCK-RESISTANT STORAGE OR ELECTROLYTIC CELLS
Filed July 26, 1965

INVENTORS
MICHEL GUY MARIE JOCHAUD Du PLESSIX
JEAN-PAUL EMILE GOMIS
BY Kenyon & Kenyon
ATTORNEYS

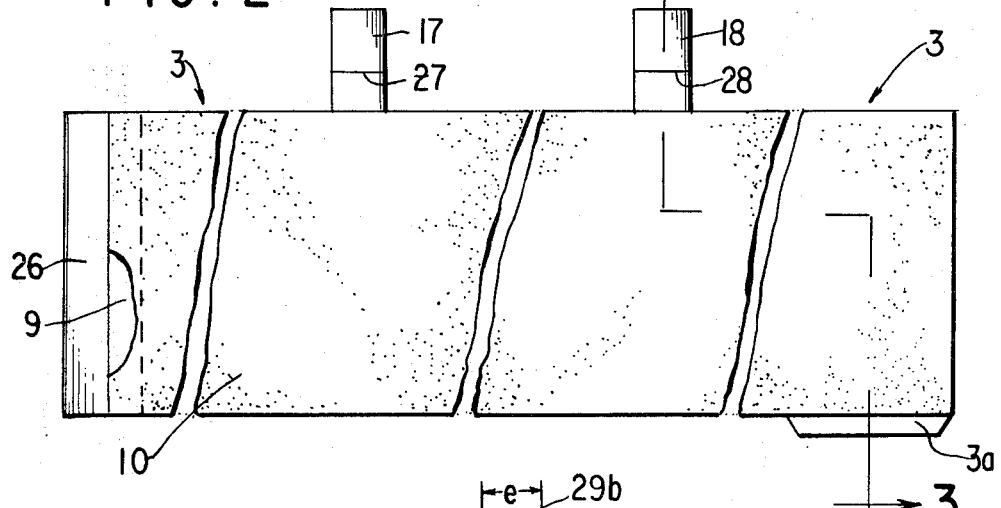
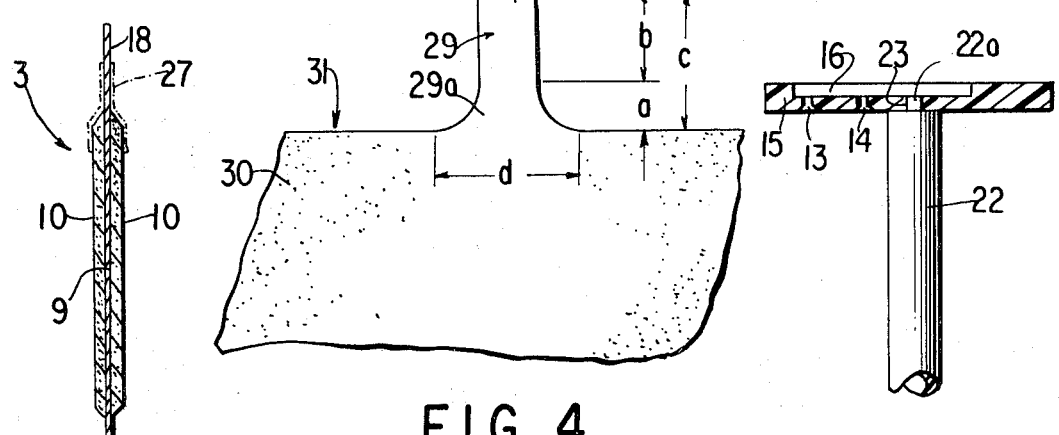
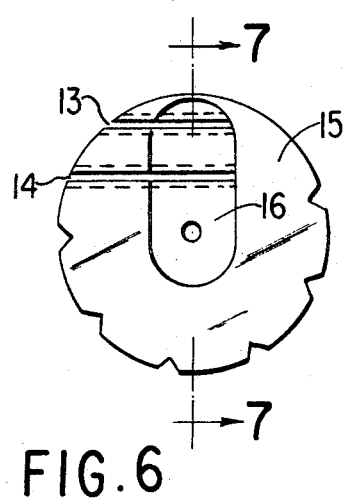
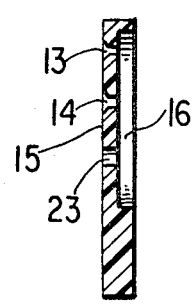
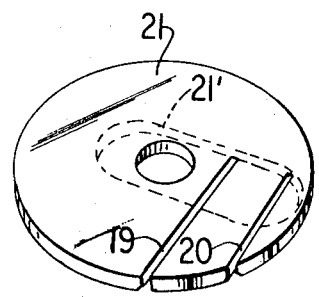

United States Patent Office 3,565,690
Patented Feb. 23, 1971

3,565,690
SHOCK-RESISTANT STORAGE OR
ELECTROLYTIC CELLS
Michel Guy Marie Jochaud du Plessix, Paris, and Jean-Paul Emile Gomis, Villemomble, France, assignors to Societe des Accumulateurs Fixes et de Traction (Societe Anonyme), Romainville, France, a company of France
Filed July 26, 1965, Ser. No. 474,569
Claims priority, application France, Aug. 4, 1964, 984,178
Int. Cl. H01m 35/04
U.S. Cl. 136—14
14 Claims

ABSTRACT OF THE DISCLOSURE

An effective shock and vibration resistant electric cell including a spirally wound assembly of electrodes and interposed separator with portions of the outermost spire of one of the electrodes joined by welding to the inner wall of a metallic container to immobilize the spiral assembly in the container. The separator edges protrude beyond the corresponding edges of the electrodes. Integral tabs are provided on the electrodes, the tabs of one electrode being electrically joined as by welding to the bottom of the container after passage through a slotted insulating disc lying between the bottom of the assembly and the bottom of the container. The integral tabs of the other electrode being electrically joined as by welding to a centrally located contact stud at the upper end of the container after passage of said last-named tabs through a slotted insulated member positioned above the spiral assembly. Another insulator member lies between the latter slotted insulator and a sealing cover for the upper end of the container. A central insulating rod in the spiral assembly abuts the upper and lower slotted insulators and aids in preventing axial displacement of the spiral assembly because of the abutment of the lower slotted insulator with the bottom of the container and the abutment of the upper slotted insulator with the insulator member that abuts the cover. The contact stud also is insulated from the cover by additional insulation. The cover is sealed as by welding to the container.

This invention relates to a storage or electrolytic cell having spiral-wound electrodes, more particularly, but not exclusively designed to withstand the effects of shocks, accelerations or the like.

Such cells may be used more especially in space crafts or other vessels which may be submitted to heavy accelerations or shocks.

One of the problems which must be solved consists in securing perfect immobilizing of the spiral-wound electrodes within the casing of the cell and in preventing any possibility of short circuiting or loosening of contacts in the cell.

A cell according to the invention is more especially notable in that it comprises a metal cup of substantially cylindrical shape having a closed bottom, at least two electrodes of opposite polarity spiral-wound with interposition of a suitable separator, one of the electrodes, e.g., the negative one being welded, e.g., electrically-welded in some points of its outer spire to the inner wall of the cup. Thus, the spiral is immobilized during a rotating motion of the cell.

According to another feature, object and characteristic of the invention, the said electrode welded to the cup being constituted by a metal sheet carrier coated with sintered metal impregnated with active material, the said sheet carrier is left bare near the edge of the electrode at least on the part thereof belonging to the outer spire, the welding of the electrode to the cup being carried out on this bare place.

According to another feature, object and characteristic of the invention, electrical connecting tabs are provided as part of at least one electrode plate, e.g., the positive one, said tabs being connected, e.g., by welding to the respectively corresponding terminals of the cell.

According to still another feature, object and characteristic of the invention, an insulating disc, made of e.g. nylon and provided with slots or the like for passage therethrough of the tabs is placed on at least one side of the edges of the spiral wound electrodes.

According to another feature, object and characteristic of the invention two insulating discs as mentioned hereabove, are placed one upon the other covering one edge of the spiral winding, the said slotted disc being situated immediately against the edge of the winding, the said electrical connections, e.g., of the positive plate, being thus compressed between the said two insulating discs, whereas a cover in which a central conductive stud is insulatively mounted in contact with the said connections above the central part of the spiral winding and caps the winding, said cover being welded for instance to the casing. Thus, the spiral winding is kept from longitudinally sliding in the casing.

According to another feature, object and characteristic of the invention, a rod made of e.g. synthetic material is provided at the center of the winding. Thus, the spiral is prevented from unwinding without complicating the construction of the cell.

Other objects, features and characteristics of the invention will appear in the following description and in the accompanying drawings, forming a part hereof:

FIG. 2 is a front elevational view in unwound state of part of a negative electrode, used in a cell according to the invention;

FIG. 3 is a sectional view along line 3—3 of FIG. 2;

FIG. 3a is a sectional view along line 3a—3a of FIG. 2a;

FIG. 4 is a view of part of an electrode useful in practicing this invention and comprising another embodiment of the tab;

FIG. 5 is a fragmentary view of a feature of the cell of FIG. 1;

FIG. 6 is a plan view of another organ embodied in the cell of FIG. 1, and

FIG. 7 is a sectional view along line 7—7 of FIG. 6, and FIG. 8 is a plan view of another organ embodied in the cell of FIG. 1.

Figure 1:
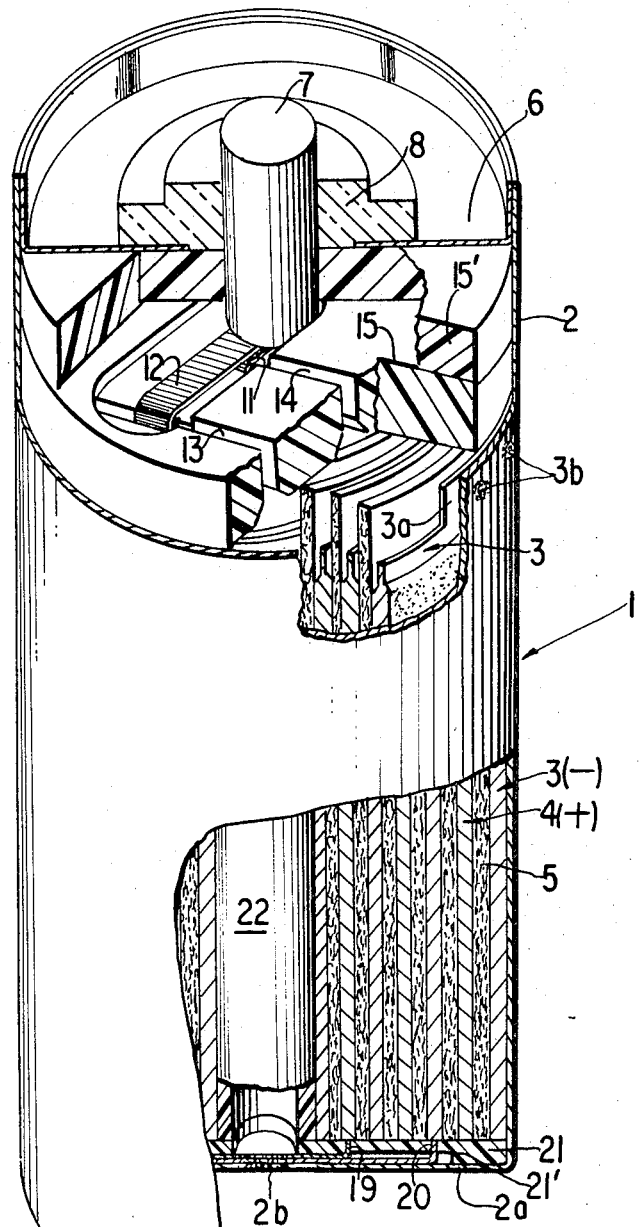
FIG. 1 is a partly sectional, partly perspective view of a cell built according to the invention.

Referring to the drawing, the embodiment shown therein includes a storage cell 1 embodying the invention. This cell comprises a metal cup-like casing 2 with a closed integral bottom 2a, two electrode plates respectively a negative electrode 3 and positive electrode 4 spirally wound and separated by a conventional separator 5. The casing 2 is closed by a cover 6 made of e.f. stamped metal welded or otherwise joined to the open top part of casing 2.

A central stud 7 is provided as part of cover 6, such stud being conductive (e.g. of metal) and insulated from cover 6 as by an insulating material, e.g. ceramic 8.

A portion 3a of the side edge of the negative electrode 3 is welded at several points 3b to the cup 2. This side edge portion 3a may advantageously be constituted by a marginal area of metal sheet 9 that is used as carrier for the sintered material 10 of the electrode 3. This is clearly shown in FIGS. 2 and 3.

Figure 2A:
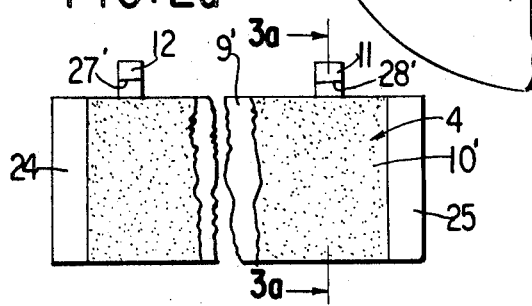
FIG. 2a is a similar view of a part of a positive electrode in uncoiled state.
Figure 3A:
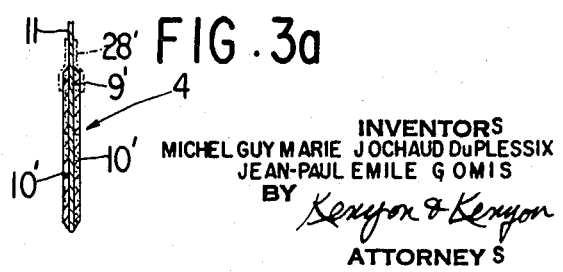

The positive electrode 4 in unwound form as seen in FIGS. 2a and 3a likewise comprises a carrier sheet 9' coated on both faces with sintered active positive material 10'. Two electrical connectors or tabs 11 and 12 respectively are advantageously provided as by two integral parts of the positive electrode carrier sheet 9'. These tabs 11 and 12 protrude from the upper edge of the spirally wound electrode assembly and pass respectively through two slots 13 and 14 provided in an insulating disc 15, the shape of which can be seen in FIGS. 6 and 7, which is mounted over said upper edge of the spirally wound electrode assembly after it has been inserted in casing 2.

FIG. 6 shows slots 13 and 14 in disc 15 through which the tabs 12 and 11 are slipped. A hollowed portion 16 is provided on the upper face of insulating disc 15 for housing tabs 11 and 12 which are turned down into it in order to constitute the positive terminal of the spiral winding. Said tabs may advantageously be electrically welded or otherwise permanently connected electrically to said stud 7 on assembly.

Along one edge of the assembled electrode winding, two tabs 17 and 18 which are part of the negative electrode carrier sheet are provided may be seen in FIGS. 1, 2 and 3 and may be constituted by a bared part of carrier sheet 9 of said negative electrode 3.

Said tabs 17 and 18, in the same way as tabs 11 and 12 pass through respective slots 19 and 20 provided in an insulating disc 21 which is placed between the lower edge of the assembled electrode winding and the bottom 2a of the casing 2. Said tabs 17 and 18 after being turned down into the outer face of disc 18 may advantageously be welded or otherwise permanently joined electrically at 2b to the cup bottom 2a. Disc 21 may have a recess 21a in its bottom face to receive the turned-in tabs 19 and 20. The welding may be accomplished electrically through the hollow central part of the assembled electrode spiral or winding when the latter have been placed in the cup 2. This hollow central part is actually the central space occupied by the winding mandrel when the electrode spiral is being formed.

In order to prevent the spiral from unwinding after it has been formed, e.g. due to vibrations or shocks which would result in a risk of causing short-circuits, this hollow part in the assembly is filled by a rod 22 advantageously made of a flexible plastic material. The upper end 22a of rod 22 as seen in FIG. 5 has a reduced diameter and is intended to fit in and be housed in a perforation 23 provided in the insulating disc which is clearly seen in FIG. 6. Advantageously, at the moment of fitting insulating disc 15 on the edge of the assembled spiral electrode winding and on the upper end of rod 22, a drop of adhesive material (not shown) is placed in perforation 23 so that insulating disc 15 and rod 22 are bound together.

Rod 22 may be solid or as shown said rod 22 can be tubular and hollow and be mounted on the winding mandrel just before the spiral electrode winding is formed. Thus, all possible tearing of sintered material of the electrode carrier sheets 9 and 9' is prevented as would be likely to occur at the moment of fitting of a solid rod 22 into the central part winding after its formation and the central hollow part of the winding is also kept clear so that tabs 19 and 20 can be electrically welded to the bottom 2a of cup 2, through the hollow part of rod 22 after insertion therein.

In an advantageous embodiment separator 5 is preferably wider than the electrodes 3 and 4 so that it protrudes from both ends of the spiral electrode winding. In this event, the separator thus also plays the part of an effective shock absorber during translatory movements of the whole winding in the cell during acceleration or other shocks.

Several expedients have also been relied upon for preventing drawbacks such as the crumbling of the active coatings of the electrode plates when the spiral electrode winding is being made, or for the breaking of connections in the cell.

More particularly, both ends of the inner electrode 4 of the winding which in the example is a positive plate, are advantageously coated with adhesive protective coatings 24, 25 as seen in FIG. 2a and which are located on the ends of the said electrodes. In the same way, an adhesive protective coating may advantageously be placed on the electrode 3, i.e., and an adhesive coating 26 is applied to the end (see FIG. 3) of the inner spire of the other electrode 3 (which is here the negative). The mode of protecting the edges of the electrodes has been described in a previous U.S. patent application filed July 31, 1964, Ser. No. 386,642, now U.S. Pat. 3,298,871, and assigned to the same assignee. It should be noted that the central protective coating 26 will, when a rod 22 is inserted into the electrode winding prevent the said rod 22 from tearing off particles of sintered material 10 on the faces of carrier plate 9 of electrode 3 which would otherwise provide a risk of causing short-circuiting later on in the assembled cell.

The connecting tabs, more particularly 17 and 18 of electrode 3 may also advantageously be provided with a protective coating consisting of pieces of adhesive strips as shown in dotted lines at 27 and 28, FIG. 2, said strips straddling the connecting tabs and the electrode 3. Thus, a premature breaking off of the connecting tabs from carrier sheet 9 is prevented and in case the connecting tabs should break, the torn or broken off piece is prevented from freely moving in the cell and thus prevents the risk of causing short-circuits therein. Similar adhesive strips 27' and 28' may be used with tabs 11 and 12, FIG. 2.

Excellent results have been obtained by using sintered electrodes with carrier sheets 9 and 9' 0.09 m. thick.

Such cells have withstood various severe mechnical tests such as:

a shock of 30 g. in 10 milliseconds along three axes;
acceleration of 42.5 g. during 5 minutes along three axes; and
vibrations of 10 to 70 Hz. (0.5 cm. from peak to peak) and 70 to 3000 Hz. (50 g. from 0 to peak).

These vibrations were effected along two axes with a range of two octaves per minute.

During these tests the cells were discharged at a three hour rate.

Other destructive tests have shown that the weak points of the cell were mainly at the connections. Thus, in another embodiment, the junctions of the respective tabs with the carrier plates proper were widened. Such arrangement is shown in detail in FIG. 4. Therein, instead of tabs 11, 12, or 17, 18 connecting tabs 29 constituted by a bare part of the carrier sheet 30 of electrode 31, either positive or negative, were widened in the part 29a joining it to the plate 31, as compared with its outer end part 29b. In an advantageous embodiment, the widened part 29a has a height $a$ which is about one third of the total height $c$ of the tab and its bottom width $d$ is about twice that $e$ of the free end 29b.

In constructing the cell 1 from the components described, after formation of the spiral electrode winding composed of a negative electrode and a negative electrode 4 with an interposed separator 5, with the respective tabs 11, 12 and 17, 18 protruding from opposite ends of the winding, the insulating disc 21 is applied to the end from which tabs 17 and 18 protrude and the latter are turned down over the outer face of said disc. Then, the sub-assembly is inserted into the metal cup 2 and the free ends of turned-down tabs 17 and 18 are electrically connected as by spot welding to the bottom 2a of cup 2 as by insertion of an appropriate welding tool through the hollow center of the winding. Similarly, the portion 3a is electrically connected as by welding at 3b to the side wall of said cup 2. Appropriate electrolyte is then added to the cell. A second insulating disk 15' of material similar to that of disc 15 is mounted on the stud 7. The non-conductive rod 22 is then inserted into the hollow center of the spiral electrode separator winding and the nylon insulating disk 15 is then mounted over the upper end of the spiral electrode separator winding, the positive electrode tabs 11 and 12 being slipped through slots 14 and 13 thereof and bent over towards the recess 16 in said disc. Then, the said tabs are electrically secured as by welding or soldering to the lower end of contact stud 7 that extends through disc 15' and cover plate 6 is inserted into the upper open end of casing 2 so that disc 15' forces the tabs 11 and 12 into recess 16 of said insulating disc 15 and also firmly presses the latter against the upper end of the spirally electrode separator winding. The outwardly protruding ends of the separator then engage the inner faces of insulating discs 15 and 21. Thereafter, the rim of cover plate 6 is united to the upper end wall of casing 2 as by welding or soldering to form a leak-proof seal and the cell is ready for use. If desired, the respective electrodes 3 and 4 may be partially or fully charged before their insertion into the casing 2.

It is to be understood that the manner of assembly described may be varied in practice without departing from the spirit of this invention.

This invention likewise may be used in the construction of shock-resistant sealed electrolytic condenser cells which have spirally wound electrode plates. It also may be used for other electrical cells or devices. In these events, the electrodes need not be covered with sintered active electrode material, but otherwise have the structures herein described.

While specific embodiments have been disclosed, variations within the scope of the appended claims are possible and are contemplated. There is no intention, therefore, of limitation to the exact details as herein described and shown.

What is claimed is:

1. A shock-resistant electric storage cell comprising a spirally wound assembly including positive and negative electrodes with a separator interposed therebetween, a cylindrical metallic container having a closed bottom, said spirally-wound assembly positioned within said container, electrolyte in said container, one of said electrodes having a bared edge on a portion of its outermost spiral turn welded internally to the inner circular side wall of said cylindrical metal container to immobilize the assembly therein, an insulating member positioned within said container between its bottom and the lower end of said spirally wound assembly, tab means extending from and formed from and as a part of said one of said electrodes projecting through slots in said insulating member and electrically connected to said bottom by welding, a second insulating member positioned within said container above the upper end of said spirally wound assembly, tab means extending from and formed from and as a part of the other of said electrodes projecting through slots in said second insulating member, a metallic cover member for the upper end of said container, a contact stud carried by said cover member, said second-named tab means being electrically connected to said contact stud by welding, said cover member being sealed to said container, a rod-like member axially positioned to fill the center of the spirally wound assembly, and an additional wedging member positioned between and in contact with the cover member and said first-named insulating member.

2. A shock-resistant electric cell according to claim 1, wherein said positive and negative electrodes are spirally wound together with said separator means interposed therebetween and wherein said separator means projects outwardly of the opposite ends of the spiral winding to serve as shock absorbers.

3. A shock-resistant electric cell according to claim 1, wherein the rod-like member filling the central space of said spirally wound assembly has a hollow tubular space and is made of insulating material.

4. A shock-resistant electric cell according to claim 1, wherein the insulating rod-like member is secured to said second-named insulating member.

5. A shock-resistant electric cell according to claim 1, wherein said positive and negative electrodes respectively comprise carrier members coated respectively with active positive and negative electrode materials and wherein said respective tab means are respectively integral with the respective carrier members.

6. A shock-resistant electric cell according to claim 1, wherein said second-named insulating member has a recess and wherein said second-named tab means are contained.

7. A shock-resistant electric cell according to claim 1, wherein said first-named insulating member has slots through which said first-named tab means project, and wherein said second-named insulating member has slots through which said second-named tab means project and also a recess into which said second-named tab means are retained.

8. A shock-resistant electric cell according to claim 1, wherein said negative electrode being said one said electrodes includes a metallic carrier member bearing active negative electrode material, and wherein said bared edge of the portion of said negative electrode, is constituted by a marginal area of said metallic carrier member and is welded to a side wall of said container and wherein said positive electrode includes a metallic carrier bearing active positive electrode material, wherein said separator projects outwardly of opposite ends of said spirally wound assembly and engages the respective first and second-named insulating members to serve as a shock absorber, wherein said assembly has a hollow center space and a rod-like insulating member is positioned within said space and between said first and second-named insulating members.

9. A shock-resistant electric cell according to claim 8 wherein each of the respective tab means is formed from and is a part of the carrier member of its respective electrode, and wherein each said tab means has a portion at its junction with its carrier member that is wider than the respective outer portion of such tab means.

10. A shock-resistant electric cell according to claim 8, including adhesive means applied to the respective tab means and to said electrodes to inhibit breakage and also to prevent separating displacement of the tab means in the event of breakage.

11. A shock-resistant electric cell according to claim 8, wherein said rod-like insulating member is tubular.

12. A shock-resistant electric cell according to claim 8, including means to prevent crumbling away of the active electrode materials on the respective electrodes.

13. A shock-resistant electric cell according to claim 12, wherein said crumble-preventing means includes adhesive material applied to ends of said electrodes.

14. A shock-resistant electric cell comprising positive and negative electrodes and interposed separator means, tabs formed from and as part of respectively the positive and negative electrodes and projecting respectively outwardly from oppositely located edges of said electrodes, said electrodes and separator being wound into spiral assembly, a cylindrical metallic container in which said assembly is located, a bared metallic edge portion of the outermost spiral turn of the electrode assembly being welded internally to the inner circular side wall of said cylindrical metallic container to immobilize the assembly in said casing, insulating slotted washers positioned at opposite ends of said spiral assembly, respective projecting tab parts of said electrodes projecting through the slots with the projections of the tabs of the electrode forming the outer spire electrically connected by welding to the container bottom, a centrally disposed hollow rod-like insulating member in the spiral assembly whose ends abut said slotted washers, a metallic cover for the container, a contact stud insulatively supported by said cover, the projections of the tabs of the other electrode being electrically connected by welding to said contact stud, and an additional washer positioned between the cover and the slotted washer adjacent said cover and said slotted washer to prevent any axial displacement of said spiral assembly, and said hollow rod-like insulating member being adhered to one of said slotted washers.

References Cited

UNITED STATES PATENTS

| | | | |
|---|---|---|---|
| 1,466,674 | 9/1923 | Stanley | 136—80 |
| 1,691,794 | 11/1928 | Woodbridge | 136—13X |
| 2,991,324 | 7/1961 | Vogt | 136—13 |
| 3,083,249 | 3/1964 | Belove | 136—13 |
| 2,361,533 | 10/1944 | Endress et al. | 136—49X |
| 3,364,069 | 1/1968 | Deschamps | 136—13 |
| 3,064,065 | 11/1962 | Belove | 136—6 |
| 3,081,366 | 3/1963 | Belove | 136—6 |
| 3,081,367 | 3/1963 | Field et al. | 136—6 |

FOREIGN PATENTS 12,713　　1912　Great Britain　　136—134

OTHER REFERENCES

Cove et al., "Webster's Third New International Dictionary," p. 1173.

ALLEN B. CURTIS, Primary Examiner

O. E. CRUTCHFIELD, Assistant Examiner

U.S. Cl. X.R.

136—6, 13